March 9, 1926.  
W. H. CARRIER  
1,575,970  
ROTARY PUMP AND THE LIKE  
Filed Sept. 2, 1922  
2 Sheets-Sheet 1
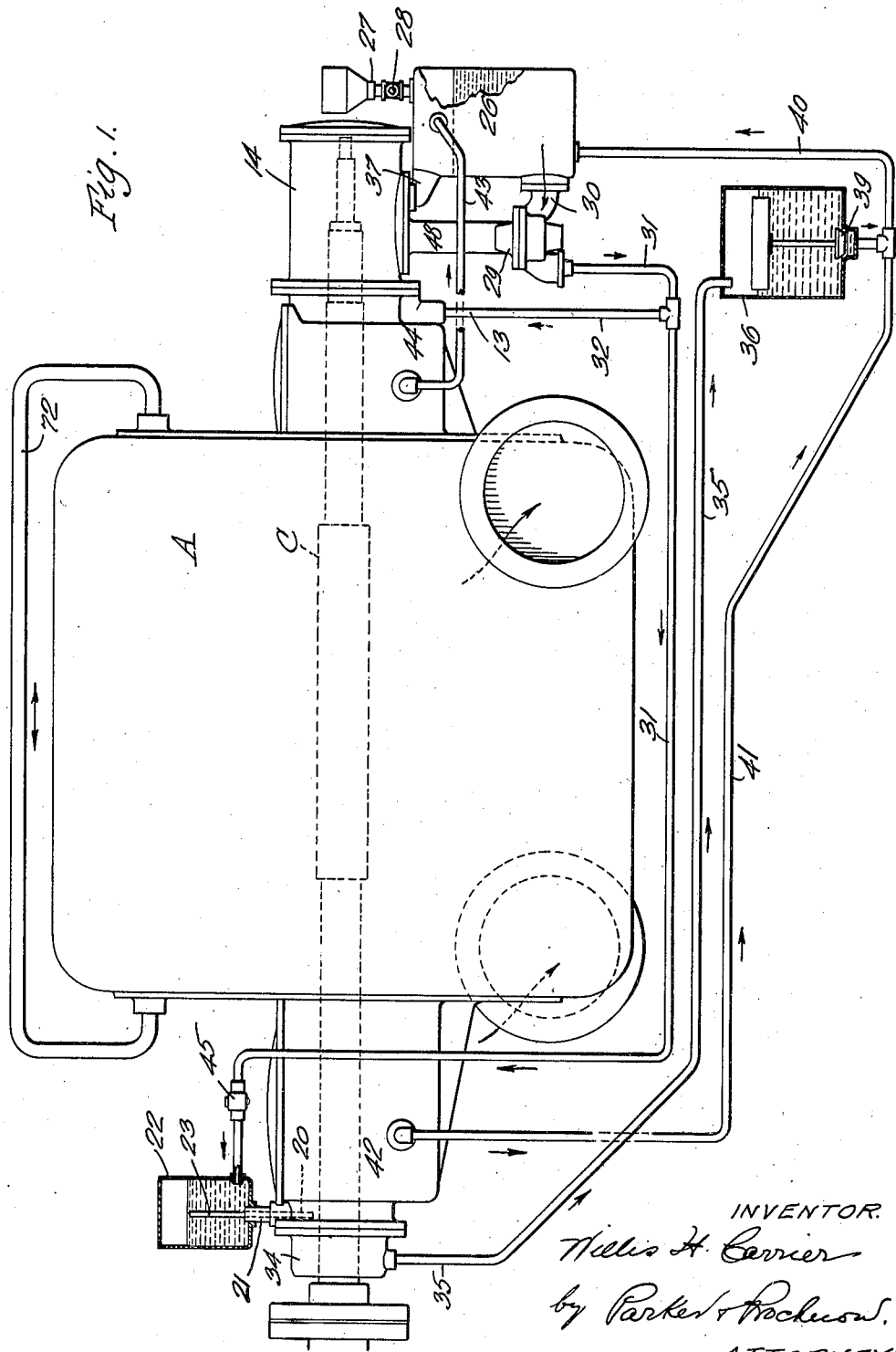
INVENTOR.  
Willis H. Carrier  
by Parker & McPherson  
ATTORNEYS.

March 9, 1926.
W. H. CARRIER
ROTARY PUMP AND THE LIKE
Filed Sept. 2, 1922    2 Sheets-Sheet 2
1,575,970
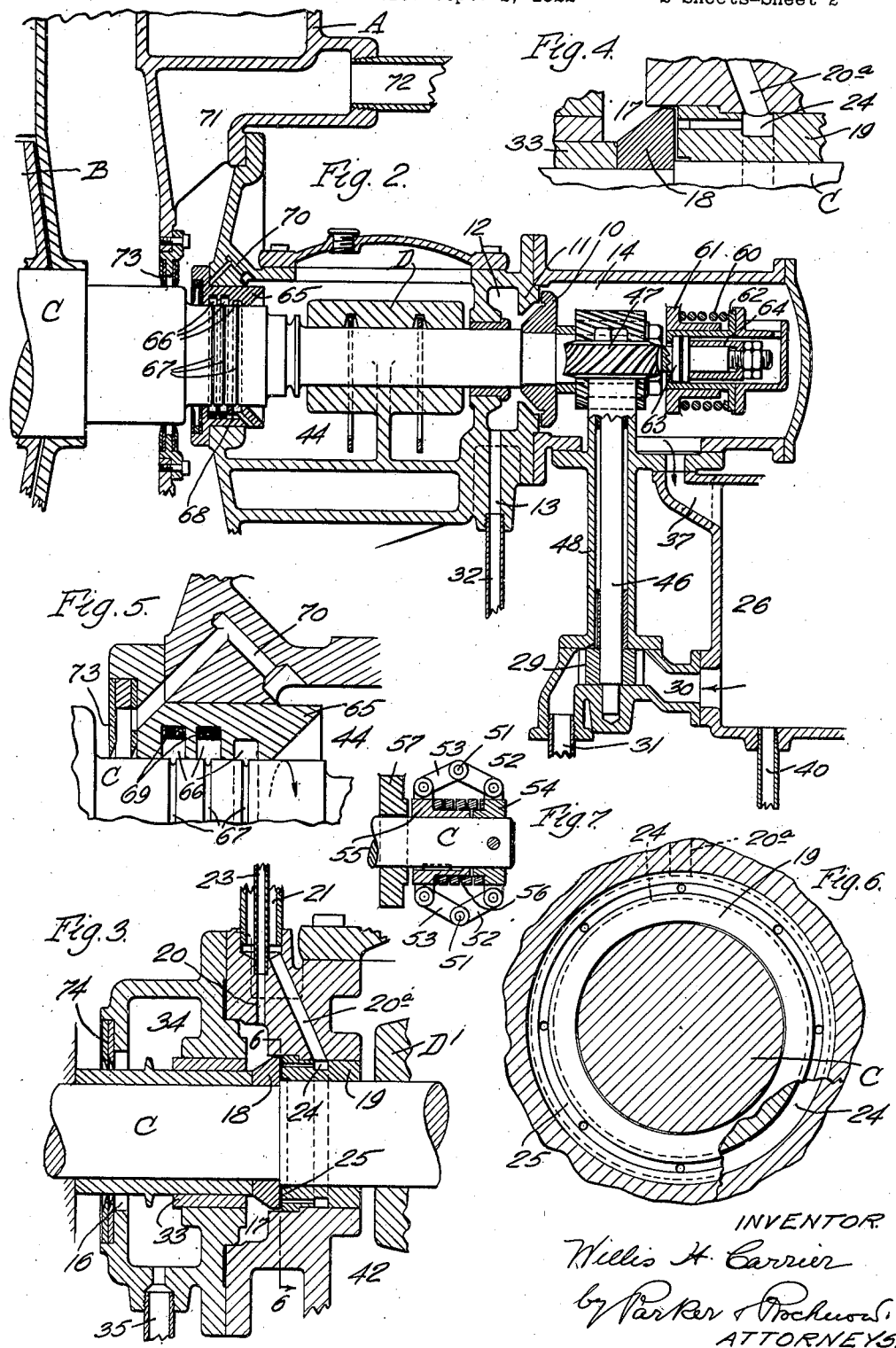
INVENTOR
Willis H. Carrier
by Parker & Rockwood
ATTORNEYS.

Patented Mar. 9, 1926.

1,575,970

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

ROTARY PUMP AND THE LIKE.

Application filed September 2, 1922. Serial No. 586,000.

*To all whom it may concern:*

Be it known that I, WILLIS H. CARRIER, a citizen of the United States, residing at Essex Fells, in the county of Essex and State of New Jersey, have invented a new and useful Improvement in Rotary Pumps and the like, of which the following is a specification.

This invention relates to means for use with centrifugal or rotary gas compressors, vacuum pumps and the like for balancing the end thrust on the pump shaft and relieving the friction incident thereto, and for providing a substantially frictionless, gas tight closure for the shaft opening through which the pump shaft passes out of the pump housing or casing. The invention is particularly desirable for use in connection with the centrifugal exhausters or compressors of refrigerating apparatus, such as disclosed in my application for United States patent filed September 2, 1922, Serial No. 585,999. The invention is not, however, restricted in its application to such use, but is applicable to elastic fluid pumps and the like for other purposes where it is important to reduce the friction to the minimum and seal the shaft opening against the leakage of air or gas therethrough, and to prevent the leakage of the sealing oil or liquid into the rotor chamber of the pump.

One object of the invention is to provide an efficient and practical fluid pressure means for balancing or taking the end thrust of the rotor shaft of the pump, and which eliminates the friction incident to the use of a thrust bearing in which there is metal to metal contact. Another object is to provide an efficient and reliable closure for the shaft opening of the pump comprising a substantially frictionless liquid seal which prevents the leakage of air or gas, or the loss of vacuum through the shaft opening when the machine is running, and a mechanical valve or device which automatically closes the shaft opening and prevents the loss of vacuum or the passage of air or gas therethrough when the machine is not running. A further object is to improve centrifugal or rotary pumps in the other respects hereinafter described and set forth in the claims.

In the accompanying drawings:—

Fig. 1 is a side elevation of a centrifugal gas pump or exhauster provided with sealing and thrust balancing means embodying the invention.

Fig. 2 is an enlarged longitudinal sectional elevation showing the thrust balancing device and associated parts which are located at the right hand end of the machine, as shown in Fig. 1.

Fig. 3 is an enlarged longitudinal sectional elevation showing the liquid seal and valve for closing the shaft opening.

Fig. 4 is a fragmentary longitudinal section on a still larger scale, of the liquid seal and valve.

Fig. 5 is a fragmentary longitudinal sectional elevation of the labyrinth liquid packing device for preventing the entrance of lubricant from the shaft bearings into the rotor chamber of the machine.

Fig. 6 is an enlarged transverse sectional elevation of the seal and valve on line 6—6, Fig. 3.

Fig. 7 is a sectional elevation showing a modified form of valve closing device.

A represents the enclosing casing or housing of the pump. The invention is not concerned with the construction of the pump or compressor proper, and this may be of known or suitable construction, the pump shown being of a multiple stage type having a plurality of rotary impellers, one of which at the compression end of the machine is shown at B, Fig. 2. C represents the rotor shaft of the pump. This shaft is journalled in suitable bearings at opposite ends of the rotor, D, Fig. 2, indicating the bearing for the right hand end of the shaft and D′, Fig. 3, indicating a portion of the bearing for the left hand end thereof. One end of the shaft, the left hand end in the drawings, extends out of the pump housing or casing for connection with the driving turbine or motor. The other end of the shaft is completely housed or enclosed so that it is only necessary to provide a single sealing or packing device for the shaft, this being located in the machine shown, at the left hand end of the housing or casing.

The pump shown is of a design such that it produces end thrust on the rotor shaft in one direction, to the left in the drawings, and the shaft with the parts carried thereby is adapted to have a slight endwise movement in its bearings. This thrust is balanced or resisted and prevented from causing friction in the following manner:—

10 represents an annular collar or thrust-balancing member which surrounds and is rigid with the rotor shaft C. This member faces a stationary, annular member or portion 11 of the pump casing which acts as a stop to limit the movement of the shaft to the left, due to the end thrust thereon. The stop member 11 forms one end of a liquid pressure chamber 12, provided in the casing A around the shaft. Liquid, preferably lubricating oil, is supplied under pressure to this chamber, as hereinafter explained, through an inlet passage 13, and this oil is adapted to exert pressure in an outward or right hand direction against the thrust-balancing member 10 so as to move the same outwardly away from the opposing stop member 11 and permit the oil to escape between the two members into a chamber 14 surrounding the thrust-balancing member 10. Oil is maintained under pressure in the pressure chamber 12 during the operation of the pump, and the pressure thereof against the member 10 tends to move the shaft in opposition to the end thrust created thereon by the compressor, thereby balancing or resisting the end thrust. This pressure is sufficient to hold the collar slightly out of contact with the stop member 11, so that the thrust is exerted through the thrust-balancing member 10 on the oil, which thus forms an oil cushion and reduces or prevents friction due to the end thrust on the shaft.

Formed in the pump housing or casing, and surrounding the compressor shaft, preferably between the bearing D' for the opposite end of the shaft and the opening 16 in the casing through which the shaft projects out of the casing, is a sealing chamber 17. Surrounding the shaft and rigid therewith within this chamber is an annular valve or member 18 arranged adjacent to and adapted, when the pump is not running, to seat against the outer end of a stationary bushing 19 surrounding the shaft. This bushing is secured in the pump casing and forms the inner end of the sealing chamber 17. The portion of the sealing chamber immediately surrounding the valve is but slightly larger in diameter than the valve so as to leave only a narrow, annular passage for the liquid around the valve. This valve is adapted to move away from its seat a slight distance which is limited or determined by the engagement of the thrust-balancing collar 10 against its stop 11, and on the other hand the valve 18 limits the distance to which the thrust-balancing collar can move away from its seat or stop 11, this distance being very slight, preferably only a few thousandths of an inch, so that the oil will always exert sufficient pressure on the thrust-balancing collar 10 to balance the end thrust on the shaft when the compressor is running and hold the thrust collar out of contact with its seat. 20 represents a passage for delivering a sealing liquid, preferably lubricating oil, to the sealing chamber 17 at the outer end of the valve, and 20$^a$ indicates a passage for delivering the oil to the space between the inner end of the sealing chamber 17 and the opposing, adjacent end of the valve. The passage 20$^a$ connects by a pipe 21 with the lower end of a receptacle or regulating chamber 22, which is closed at the top, and the other passage 20 connects with a pipe 23 which communicates at its upper end with the upper portion of said receptacle below its top. As shown, the pipe 23 extends through the pipe 21 and up into the receptacle. The outer pipe 21 forms in addition to the oil passage, a support for the receptacle 22. Preferably the passage 20$^a$ leads to a circumferential groove 24 in the bushing 19 from which holes or passages extend through the bushing to an annular groove 25 in the end thereof against which the valve 18 seats so as to deliver the liquid to the space between the valve and the bushing.

The oil or sealing liquid is supplied continuously to the sealing chamber 17 and the pressure chamber 12 preferably as follows: 26, Fig. 1, represents a main oil or liquid reservoir provided with a filling funnel or pipe 27 equipped with a stop cock 28 for tightly closing the reservoir. An oil circulating pump 29 takes the oil from the reservoir 26 through a suction passage 30 and delivers the oil under pressure through a pipe 31 to the oil receptacle 22, and by a branch pipe 32 to the inlet 13 for the pressure chamber 12. The oil delivered to the sealing chamber 17 is adapted to escape from the same, through a sleeve or bushing 33 surrounding the pump shaft C, into a chamber 34 in the pump casing A surrounding the shaft A, and from this chamber the oil returns through a pipe 35 to a trap 36. The oil escaping out of the pressure chamber 12 past the thrust-balancing collar 10 is returned to the oil reservoir through a suitable passage 37, Fig. 2, leading from the chamber 14 of the centrifugal pump casing to the reservoir. The trap 36 has a discharge passage controlled by a suitable float valve 39, and connecting with a return pipe 40 leading to the reservoir 26. 41 represents an overflow pipe for returning oil from the oil chamber 42 containing the left hand bearing D' for the pump shaft C, to the return pipe 40, and 43 represents an overflow pipe connecting the oil chamber 44 for the right hand shaft bearing D with the main oil reservoir 26. The oil pump 29 is operatively geared to or connected with the main pump so that during the operation of the latter, the oil pump operates and continuously delivers the oil from the reservoir 26 to the receptacle 22, and to the pressure chamber 12 for the thrust balancing device, the oil being returned from the sealing chamber and the pressure chamber 12 to the reservoir and being continuously circulated.

The supply pipe 31 for the oil receptacle 22 is provided with a check valve 45 so that the oil is maintained under pressure in the receptacle and an air cushion is formed in the upper end of the receptacle above the oil therein. The pipe 23 opens into the receptacle 22 at such a height that when the oil pump is running, the air cushion in the top of the receptacle 22 is compressed sufficiently for the oil to rise in the receptacle to the upper end of the pipe 23, so that under these conditions the oil discharges from the receptacle through the pipe 23, and the pipe 21 to the sealing chamber 17 at opposite ends of the valve 18. This balances the pressure in the sealing chamber at opposite ends of the valve 18, and forms an oil seal surrounding the compressor shaft which effectually prevents the leakage of air or gas through the shaft opening 16. When the main pump and oil pump stop running, the pressure in the receptacle 22 will be reduced and the air cushion in the top of the receptacle will force the oil in the receptacle down below the upper end of the stand pipe 23 so that the oil cannot then discharge through this pipe. The latter pipe then serves as a vent pipe for the receptacle 22, admitting air to the same, the air leaking into the sealing chamber 17 through the shaft opening 16 in the casing and the bushing 33 at the other side of the sealing chamber. The oil will then feed by gravity from the receptacle 22 through the pipe 21 and connecting passages in the bushing 19, and pass between the seat and the valve and through the shaft opening in the bushing 19 into the oil chamber 42 for the adjacent shaft bearing D'. At such time, the valve 18 is seated against the end of the bushing 19, and only sufficient oil can seep through between the valve and its seat to form an oil film between these parts, which assists the valve in maintaining a gas tight closure around the compressor shaft.

The oil pump 29 may be of any suitable construction. A gear pump is shown, the shaft 46 of which is driven by suitable gearing 47 connecting it to the main pump shaft C. The oil pump shaft is completely enclosed by a sleeve or casing 48 which connects the oil pump casing with the chamber 14 enclosing the adjacent end of the compressor shaft.

As before stated, when the pump shaft C is running, the sealing valve 18 is held off of its seat by the end thrust of the pump on said shaft. When the pump stops running, the valve is seated to effect the closure of the shaft opening by suitable means which move the shaft endwise in the opposite direction from that in which the thrust is exerted. Any suitable means for this purpose can be employed, as for instance, a spring device, or a device in the nature of a centrifugal governor which when the compressor is running, permits the movement of the shaft by the end thrust of the compressor thereon, but when the compressor stops, shifts the shaft in the opposite direction to seat the valve 18. A centrifugal device is shown in Fig. 7 for this purpose. This consists of governor weights 51 pivoted to the adjacent ends of links 52 and 53. The outer ends of the links 52 are pivoted to a fixed collar or part 54 on the pump shaft C, and the outer ends of the other links 53 are pivoted to a collar 55 slidable on the shaft C. A spring 56 between the sliding collar and the fixed collar tends to force the collars apart and move the sliding collar against an adjacent stationary abutment 57 and, by reacting from the same on the shaft, to move the shaft to the right. When the pump is running, the centrifugal action of the weights 51 compresses the spring 56 and holds the sliding collar out of contact with the abutment 57 so that there is no friction between these parts, but when the pump stops, the inward movement of the centrifugal weights permits the spring to expand and move the slide collar into engagement with the abutment 57. The spring then reacts against the abutment and moves the shaft to the right, thereby seating the valve 18.

An alternative means for this purpose is shown in Fig. 2, consisting of a coil spring 60 surrounding the shaft C between a fixed abutment 61 and a sleeve 62 which is arranged to slide endwise in the abutment 61, and has a flange engaging a ball thrust bearing 63 surrounding the shaft C between the flange of the sleeve and an inner sleeve 64, which is adjustably secured on the end of the shaft. The spring 60 acting on the sliding sleeve tends to move the shaft to the right, and when the end thrust on the shaft is relieved by the stopping of the pump, the spring will move the shaft to the right and seat the sealing valve 18. When the pump is running, the oil or liquid pressure against the thrust-balancing collar 10 tends to move the shaft in the same direction, that is to the right, and relieves the pressure on the thrust bearing 63, so that the friction on this bearing is not sufficient to be objectionable.

In order to prevent the leakage of oil from the shaft bearings along the shaft into the rotor chamber of the pump A, a suitable barrier or dam for the oil is preferably provided between each of the shaft bearings and the adjacent end of the rotor chamber, the barrier for the right hand end of the shaft being shown in Figs. 2 and 5. As here shown, this consists of a sleeve 65 through which the shaft passes and which is provided with a plurality of internal, circumferential grooves 66. The shaft is provided within each of these grooves with a circumferential channel or groove 67 which acts by centrifugal force when the shaft is running to throw any oil collecting on the shaft off of the same into the groove. The grooves are preferably connected at their bottoms by a passage 68 which is adapted to return the oil to the oil chamber 44 for the adjacent shaft bearing. Absorbent material 69 is preferably placed in one or more of the grooves to hold the oil when the shaft is not running. In order to equalize the pressure at opposite ends of this labyrinth barrier and thus prevent any tendency for the oil to be forced through the same by reason of unequal pressures at opposite ends of the barrier, an equalizing passage 70 is provided which connects the two chambers in the pump casing at opposite ends of the barrier. The chamber 71 between the barrier and the rotor chamber of the pump is preferably connected by an equalizing passage 72 with the chamber at the opposite or suction end of the pump. A partial vacuum is thus maintained in the chambers at opposite ends of the pump casing and the equalizing passage 70 connecting with the chamber 71 equalizes the pressure at opposite ends of the barrier.

Packing rings 73 are also preferably provided around the shaft C at the inner end of the barrier and between the chamber 71 and the rotor chamber of the pump. 74, Fig. 3, likewise indicates packing rings for surrounding the shaft C in the shaft opening 16, through which the shaft extends out of the casing A.

I claim as my invention:

1. The combination with a fluid pump having a rotary shaft extending through an opening in the pump casing, of a valve and valve seat which cooperate to form a closure for said shaft opening when the pump is not running, said valve being held off of its seat when the pump is running, and mechanism which maintains a sealing liquid between said valve and valve seat and forms a liquid seal for said shaft opening when the pump is running.

2. The combination with a fluid pump having a rotary shaft extending through an opening in the pump casing, of a valve and valve seat which cooperate to form a closure for said shaft opening when the pump is not running, said valve being held off of its seat when the pump is running by the end thrust produced by the pump and seating automatically when the pump stops, and mechanism which maintains a sealing liquid between said valve and valve seat and forms a liquid seal for said shaft opening when the pump is running.

3. The combination with a fluid pump having a rotary shaft extending through an opening in the pump casing, of a valve and valve seat which cooperate to form a closure for said shaft opening when the pump is not running, said valve being held off of its seat when the pump is running by the end thrust produced by the pump, mechanism for seating said valve when the pump stops, and mechanism which maintains a sealing liquid between said valve and valve seat and forms a liquid seal for said shaft opening when the pump is running.

4. The combination with a fluid pump having a rotary shaft extending through an opening in the pump casing, of a sealing chamber surrounding said shaft, an annular member on said shaft rotating in said sealing chamber, and mechanism which maintains liquid under pressure between said annular member and the walls of said chamber to form a liquid seal for said shaft opening when the shaft rotates, said annular device cooperating with one end of said sealing chamber to form a closure for said shaft opening when the rotation of said shaft stops.

5. The combination with a fluid pump having a rotary shaft extending through an opening in the pump casing, of a sealing chamber surrounding said shaft, an annular member on said shaft rotating in said sealing chamber and cooperating with one end of said sealing chamber to form a closure for said shaft opening when the rotation of said shaft stops, and mechanism which delivers sealing liquid under pressure to said sealing chamber at opposite ends of said annular member while the pump is running to form a liquid seal for said shaft opening, and which delivers said liquid to the before mentioned end of said sealing chamber when the rotation of said shaft stops.

6. The combination with a fluid pump having a rotary shaft extending through an opening in the pump casing, of a sealing chamber surrounding said shaft, an annular member on said shaft rotating in said sealing chamber and cooperating with one end of said sealing chamber to form a closure for said shaft opening when the rotation of said shaft stops, a liquid receptacle closed at its upper end, a descending passage connecting the lower portion of said receptacle to the beforementioned end of said sealing chamber, a passage leading from the upper portion of said receptacle to said sealing chamber, a propelling device for delivering liquid under pressure to said receptacle while the pump is running to supply liquid through both of said passages to the sealing chamber, said second mentioned passage serving to vent said liquid receptacle to cause the delivery of liquid through said first mentioned passage when said liquid propelling device stops.

7. The combination with a fluid pump having a rotary shaft extending through an opening in the pump casing, of a sealing chamber surrounding said shaft, an annular member on said shaft rotating in said sealing chamber and cooperating with one end of said sealing chamber to form a closure for said shaft opening when the rotation of said shaft stops, a liquid propelling device for delivering sealing liquid to said sealing chamber, and a receptacle and connections interposed between said liquid propelling device and sealing chamber whereby the sealing liquid is delivered under pressure to said sealing chamber at opposite ends of said annular member while the pump is running, and is delivered to said beforementioned end of the sealing chamber when the rotation of said shaft stops.

8. The combination with a fluid pump having a rotary shaft extending through an opening in the pump casing, of a valve and a valve seat which cooperate to form a closure for said shaft opening when the pump is not running, said valve being moved away from said seat while the pump is running by end thrust produced by the pump, fluid pressure actuated mechanism which resists said end thrust and limits the movement of said valve away from its seat, and means which maintain a liquid seal for said shaft opening while the pump is running.

9. The combination with a fluid pump having a rotary shaft extending through an opening in the pump casing, of an annular valve on said shaft, a seat against which said valve seats to form a closure for said shaft opening when the pump is not running, said valve being moved away from said seat when the pump is running by end thrust on said shaft, a thrust-balancing member on said shaft, a member opposing said thrust-balancing member, mechanism which delivers fluid under pressure between said thrust-balancing member and its opposing member to resist said end thrust and hold said members out of contact, and means which maintain a liquid seal for said shaft opening while the pump is running.

10. The combination with a fluid pump having a rotary shaft extending through an opening in the pump casing, of a valve and a valve seat which cooperate to form a closure for said shaft opening when the pump is not running, said valve being held off of said seat while the pump is running by end thrust produced by the pump, a thrust-balancing member and an opposed stop member, and means for maintaining liquid under pressure between said members to resist said end thrust and hold said members out of contact with each other.

11. The combination with a fluid pump having a rotary shaft extending through an opening in the pump casing, of an annular valve on said shaft, a seat against which said valve seats to form a closure for said shaft opening when the pump is not running, said valve being held off of said seat while the pump is running by end thrust on said shaft, a thrust-balancing member on said shaft and an opposed stop member, and means for maintaining liquid under pressure between said members to resist said end thrust and hold said members out of contact with each other.

12. The combination with a fluid pump having a rotary shaft extending through an opening in the pump casing, of a liquid sealing chamber surrounding said shaft, an annular sealing member on said shaft in said sealing chamber adjacent an opposing part of said chamber, said sealing member being movable away from said opposing part by end thrust on said shaft, said sealing chamber containing liquid under pressure to form a liquid seal for said shaft opening, a thrust-balancing member on said shaft, an opposing stop member, and means for maintaining liquid under pressure between said last mentioned members to resist said end thrust and limit the movement of said sealing member away from said opposing part of the sealing chamber.

13. The combination with a rotary fluid compressor having a drive shaft which extends through an opening in the compressor casing, of enclosed bearings for the compressor rotor respectively at the suction and pressure ends of the compressor, means for equalizing fluid pressure in said bearings, and a pressure liquid seal for said shaft opening arranged outwardly beyond the adjacent bearing with the bearing between the liquid seal and the compressor.

14. The combination with a rotary fluid compressor having a drive shaft which extends through an opening in the compressor casing, of an enclosed bearing for the compressor rotor having the bearing enclosure in communication with the suction end of the compressor, and a pressure oil seal for said shaft opening arranged outwardly beyond the bearing with the bearing between the oil seal and the compressor, so that oil from the oil seal flows into the bearing.

15. The combination with a rotary fluid compressor having a drive shaft which extends through an opening in the compressor casing, of enclosed bearings for the compressor rotor respectively at the suction and pressure ends of the compressor, means for equalizing the fluid pressure in said bearings, a pressure oil seal for said shaft opening, and a common closed oil pressure circuit for supplying oil to said oil seal and bearings.

16. The combination with a rotary fluid compressor having a drive shaft which extends through an opening in the compressor casing, of enclosed bearings for the compressor rotor respectively at the suction and pressure ends of the compressor, an oil barrier between each bearing and the rotor chamber of the compressor for obstructing passage of oil from the bearing into the rotor chamber, and fluid pressure connections for equalizing the fluid pressure in the bearing enclosures and at opposite sides of said oil barriers.

WILLIS H. CARRIER.